Oct. 31, 1939.    W. L. L. VIVIE    2,177,849
SLIDABLE CONDENSER HAVING SPIRAL ELECTRODES
Filed March 17, 1938

INVENTOR
WILHELMUS L.L. VIVIE
BY
ATTORNEY

Patented Oct. 31, 1939

2,177,849

UNITED STATES PATENT OFFICE 2,177,849

SLIDABLE CONDENSER HAVING SPIRAL ELECTRODES

Wilhelmus Lambertus Leonardus Vivie, Eindhoven, Netherlands, assignor to N. V. Philips' Gloeilampenfabrieken, Eindhoven, Netherlands, a corporation of the Netherlands Application March 17, 1938, Serial No. 196,319
In Germany March 30, 1937

1 Claim.  (Cl. 175—41.5)

The invention concerns the adjustment of the maximum capacity and, if desired, also of the minimum capacity of slidable condensers which have spiral electrodes.

In particular when condensers are united to form multiple condensers such as are generally utilized in radio-receiving apparatus and the like, it is desirable, for the purpose of making the condensers mutually equal, in which event capacities present in the circuit-arrangement are frequently to be taken into account, to effectuate the adjustment of the maximum capacity independently of the adjustment of the minimum capacity.

According to the invention, with condensers having spiral electrodes the maximum capacity is adjusted by turning the electrodes relatively to one another. The minimum capacity may be adjusted by altering the greatest distance between the two electrodes.

Figure 1:
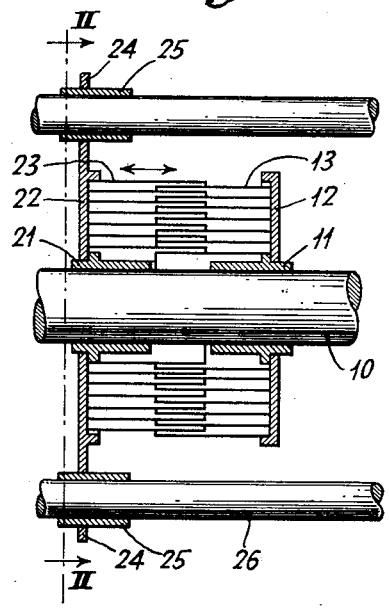
Figure 2:
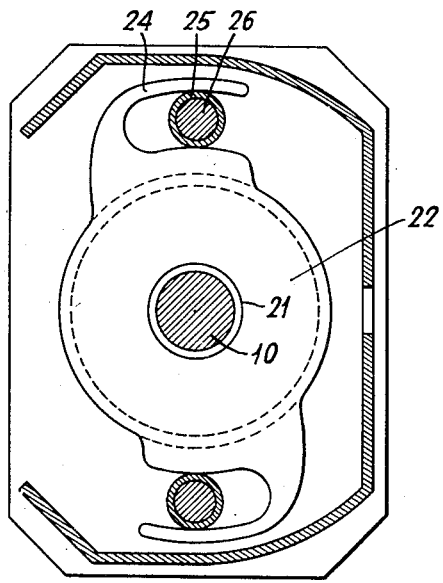

The invention will be explained more fully with reference to the accompanying drawing in which Figures 1 and 2 represent, by way of example, a sectional view and a plan view of one embodiment of the invention.

A bush 11 is shrunk on a stationary shaft 10. A spiral electrode 13 which is soldered to a support 12 which is connected to the bush 11, constitutes one of the condenser electrodes. A further bush 21 is mounted on the shaft 10 so as to be slidable and, jointly with a support 22 and a spiral electrode 23 it constitutes the movable condenser electrode. The support 22 is provided with an attachment eyelet 24 by means of which, after the adjustment of the minimum and maximum capacity, the movable electrode is secured, e. g., by soldering to a bush 25 capacity. The bush 25 is shrunk on a bar 26. The minimum capacity is adjusted by altering the minimum distance between the two electrodes. Subsequently, the two electrodes are slid into one another as far as possible and by turning one of the electrodes the maximum capacity is adjusted to the value desired.

Then the electrodes are secured to the bush 25, for example by soldering, screwing or the like. It is also possible, of course, to mount the bush 25 on the bar 26 so as to be slidable and to fix its position after the adjustment, for example, by means of an adjusting screw.

Figure 2 shows a plan view of a casing which has secured in its side-wall the shaft 10. The support 26 is coupled with an adjusting device which is not shown.

It will be seen that the two adjustments do not influence one another, which is required in particular with radio receiving apparatus.

I claim:

In a variable condenser having spiral electrodes each of which is in the form of a plate wound in a spiral about a common axis, said electrodes being arranged to inter-mesh with each other, the method of providing minimum and maximum capacity adjustments for said condenser which method consists in firstly determining the minimum capacity by withdrawing one of the electrodes from the other and adjusting the distance between the withdrawn electrodes until the proper minimum capacity value is reached and thereafter completely meshing the electrodes of the condenser and rotating one of the electrodes with respect to the other to thereby change the spacing between the electrodes until the desired maximum value of capacity is reached.

WILHELMUS LAMBERTUS
                LEONARDUS VIVIE.